Oct. 4, 1932.   E. J. W. RAGSDALE   1,880,477
VEHICLE BRAKE
Filed May 1, 1929
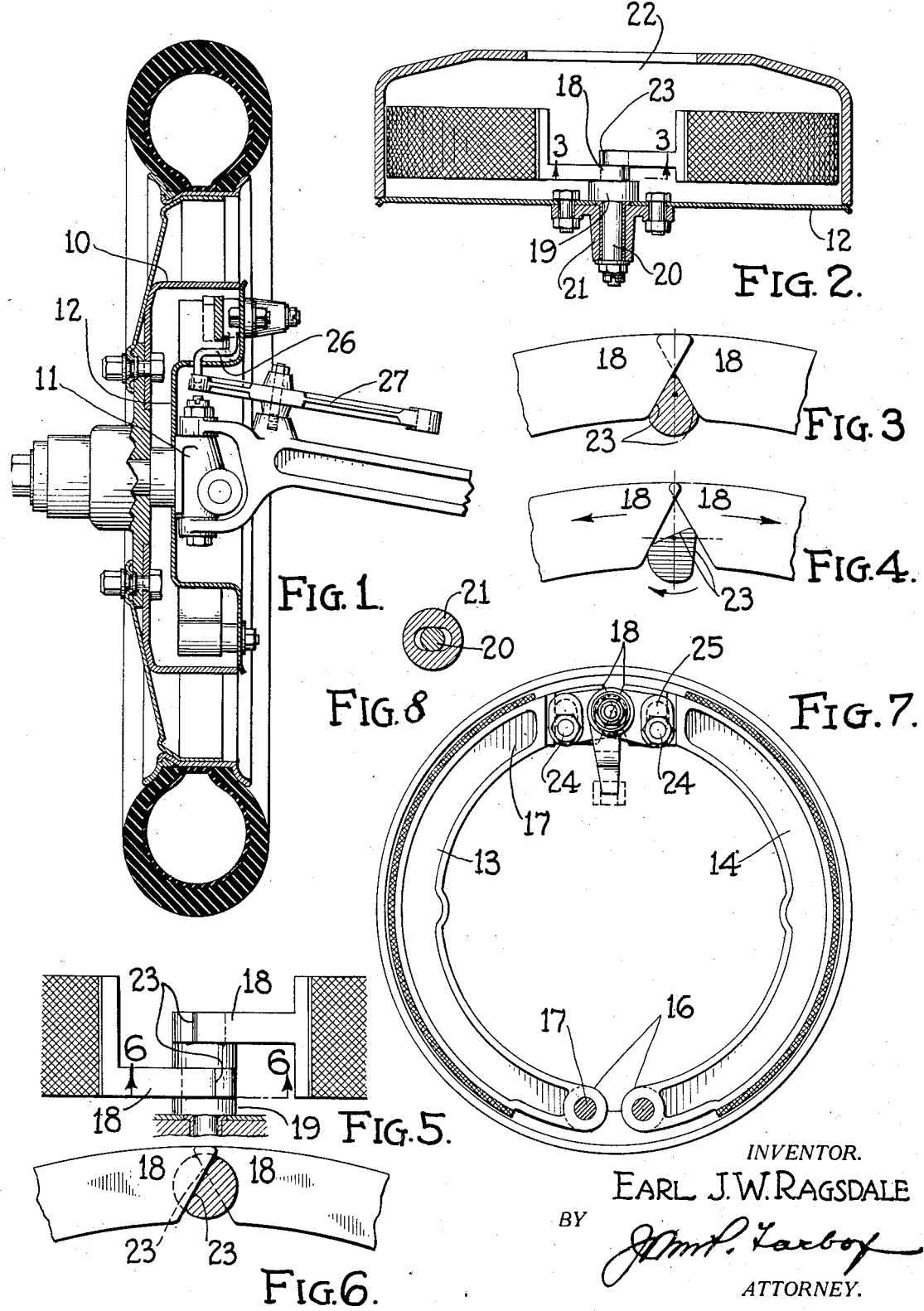
INVENTOR.
EARL J. W. RAGSDALE
BY
ATTORNEY.

Patented Oct. 4, 1932

1,880,477

UNITED STATES PATENT OFFICE

EARL J. W. RAGSDALE, OF NORRISTOWN, PENNSYLVANIA, ASSIGNOR TO BUDD WHEEL COMPANY, OF PHILADELPHIA, PENNSYLVANIA, A CORPORATION OF PENNSYLVANIA

VEHICLE BRAKE

Application filed May 1, 1929. Serial No. 359,472.

The brake of my invention is primarily adapted for use in automotive vehicles of the passenger car type, yet it has doubtless applications in other fields of the automotive industry, if indeed, not also other applications in the general field of braking. Its applicability is in the main to multiple shoe brakes, that is to say, brakes in which two or more shoes coact with the single drum and are provided with a common actuator or actuating mechanism. Its prime object is to simplify the actuator and actuating mechanism and the adjustment of the brakes. Its aim is to embody the actuating means and the adjusting means in one and the same mechanism.

To these ends I pivot one pair of adjoining ends of a pair of brake shoes and render the other pair freely movable as in common practice. But these freely movable ends I oppositely incline with respect to a principal axis plane of the brake. I also axially offset them from juxtaposition in the plane of the shoes and project the one inclined end past the other. I interpose between them a cam mounted on a transverse rotation axis and having cam surfaces complementally inclined, offset, and overlying in axial projection, which cam is radially adjustable to compensate for wear on the brakes, and also tangentially adjustable to equalize the operation of the brake and to equalize the adjustment for wear.

The drawing shows the best embodiment of my invention now known to me, but it is obviously susceptible of other embodiments.

Fig. 1 is an axial cross section of the steering wheel of an automobile equipped with my invention.

Fig. 2 is a horizontal cross-section of the actuating mechanism with the brake drum and brake drum cover shown in section.

Figs. 3 and 4 are enlarged transverse cross sections of the actuating cam and shoe ends.

Figs. 5 and 6 are plan and transverse sections of a modified form of actuator and shoe ends, Fig. 6 being taken on line 6—6 of Fig. 5.

Figure 7 is a cross section taken through an assembled brake drum unit showing a modified form of the cam in use, and Figure 8 is a cross section taken through the shank of a modified form of cam unit.

The wheel shown is a steering wheel being connected by the usual steering knuckle to an axle of the vehicle. Its hub supports the demountable disc wheel and also brake drum 10. Connected with the steering knuckle 11 fixedly, is the brake drum cover and brake mechanism support 12. Brake shoes 13 and 14 are supported by the lower pair of adjacent ends 16 from pivots 17 on this cover and support 12. Its upper ends 17 are freely movable with respect to each other.

These upper ends I provide with oppositely inclined cam surfaces 18. These surfaces, instead of being juxtaposed to each other in the plane of the brake shoes, are laterally or in other words, axially offset and projected circumferentially past each other in part at least, so that they overlie, and in axial projection as appearing in Fig. 4, their planes cross each other. These cam surfaces are in the form of hardened steel ends secured to the brake shoes 13, 14 in any suitable manner.

The actuator interposed between them is designated generally 19. Its main body is cylindrical in form. It is mounted by a shank 20 supported in the bearing member 21 on an axis of rotation extending transversely of the plane of the brake shoes, and substantially centrally of the inter-secting planes of the inclined offset and overlying ends 18 of the shoes 13, 14. The actuator 19 is extended between these ends 18. The portion so extended is complementally inclined offset and overlying, in the form of complemental cam surfaces 23. This is achieved by milling slots in the cylindrical main body 19 of appropriate width and depth to form the cam surfaces 23 in position to complementally engage the ends 18. The corners formed by the intersection of cam surface 23 with the cylindrical periphery 19 and other surfaces are rounded slightly to constitute them sliding surfaces of ample area. The inclined ends 18 open downwardly toward the axis, and the complementally inclined surfaces 23 of actuator 19 open upwardly, constituting an upwardly pointed wedge.

The mounting of bearing member 21 is by means of bolts 24 connecting its opposite ends to the cover plate 12. These bolts have a radially extending lost motion connection 25 with the cover plate. By reason of slots in the cover plate through which they pass, the bearing member 21 with the actuator 19 may be radially moved outwardly. The slots 25 likewise have a clearance peripherally of the drum, that is to say, laterally of the bolts 24, whereby a certain amount of peripheral adjustment of the actuator is possible.

A crank arm 26 downwardly, inwardly, and again downwardly turned to a point in line with the axis of the steering knuckle 11, is engaged by an operating lever 27 pivoted to the axle of the vehicle for the purpose of actuating the brake. This crank arm 26 passes through a slot in the offset of the cover plate 12.

Very clearly, when the bolts 24 are loosened and the bearing member 21 is moved radially outwardly, the wedge constituted by the cam surfaces 23 of the actuator operating between the downwardly diverging cam surface 18 of the shoes 13, 14, spreads the adjoining freely movable ends 17 of the brake shoes, until the shoes contact with the drum. A slight retrograde movement of the bearing 21 inwardly achieves a perfectly adjusted seating of the brake shoes with equalized clearance between them and the drum. The bolts 24 are then drawn home to secure the bearing in its adjusted position. The retracting springs (not shown) retain the cams 18 of the shoe ends 17 in intimate contact with the cam surfaces 23 of the actuator 19. The brakes may then be actuated in the usual manner through the lever 27 to rotate the actuator 19 on its axis. Rotation causes the rounded corners of the cam surfaces 23 to ride over the inclined cam surfaces 18 of the ends 17 and move them apart, bringing the shoes into a fully equalized braking contact with the drum.

Clearly the simple unitary actuator 19 is of the most sturdy, strong and durable construction, yet at one and the same time it provides fully equalized actuation of the brake shoes 13, 14, and a most ready and perfect means of adjusting them so that they may be operated in an equalized manner, provides full compensation for differential wear as between brakes 13, 14, by reason of the lost motion connection 25 and its clearances, and constitutes limit stops for the brake shoes, which preserve fully the equalized settings when made.

If desired, the lateral lost motion, instead of being provided in the connection 25, may be provided in connection with the shank 20 of the actuator 19, as shown in Fig. 8.

Figs. 5 and 6 show a modified cam in which the cam surfaces 23 actually overlap each other in axial projection, by reason of the greater diameter of the actuator body 19, and the location of the center of the body with relation to the shoe ends 18, which themselves overlap.

This and all other modifications of my invention partaking of its generic spirit are to be comprehended in the annexed claims.

What I claim and desire to secure by Letters Patent is:

1. A vehicle brake comprising a pair of oppositely acting brake shoes pivoted at one pair of adjacent ends, and freely movable at the other pair, together with an actuating device interposed between the free ends of the shoes and rotatable to simultaneously and oppositely actuate the brake, but adjustable as a unit radially to adjust the brakes.

2. A vehicle brake comprising a pair of oppositely acting brake shoes pivoted at one pair of adjacent ends, and freely movable at the other pair of adjacent ends, which latter ends are oppositely inclined with respect to a principal axis plane, together with a radially adjustable cam actuating device interposed between said oppositely inclined ends on a transverse rotation axis and having cam surfaces complementally inclined.

3. A vehicle brake comprising a pair of oppositely acting brake shoes pivoted at one pair of adjacent ends, and freely movable at the other pair, the ends of which latter pair are oppositely inclined with respect to a principal axis plane and offset from juxtaposition with each other, together with a cam actuating device interposed between said oppositely inclined and offset ends on a transverse rotation axis, and having cam surfaces complementally inclined and offset.

4. A vehicle brake comprising a pair of oppositely acting brake shoes pivoted at one pair of adjacent ends, and freely movable at the other pair, the ends of which latter pair are oppositely inclined with respect to a principal axis plane, but offset respectively relatively to the plane of the shoes, together with a cam actuating device interposed between said oppositely inclined and offset ends on a transverse rotation axis, and having cam surfaces complementally inclined and offset.

5. A brake comprising a pair of oppositely acting brake shoes pivoted at one pair of adjacent ends, and freely movable at the other pair, the ends of which latter pair are oppositely inclined with respect to an axis plane, but offset from juxtaposition and in axial projection overlying each other, together with a cam actuating device interposed between said inclined offset and overlying ends on a transverse rotation axis, and having cam surfaces complementally inclined, offset and overlying.

6. A brake comprising a pair of oppositely acting brake shoes pivoted at one pair of adjacent ends, and freely movable at the other pair, together with an actuating device interposed between the free ends of the shoes and rotatable to simultaneously and oppositely actuate the brake, but adjustable as a unit laterally of the free ends of the shoes to adjust the same, and having a lost motion tangentially of the shoes.

In testimony whereof I hereunto affix my signature.

EARL J. W. RAGSDALE.